United States Patent
Liebig et al.

(10) Patent No.: US 6,775,919 B2
(45) Date of Patent: Aug. 17, 2004

(54) RADIALLY RELIEVED LOCATING PIN

(76) Inventors: Thomas J. Liebig, Box 210515, Chula Vista, CA (US) 91921-0515; Sharon A. Liebig, Box 210515, Chula Vista, CA (US) 91921-0515

( * ) Notice: Subject to any disclaimer, the term of this patent is extended or adjusted under 35 U.S.C. 154(b) by 0 days.

(21) Appl. No.: 10/152,759

(22) Filed: May 22, 2002

(65) Prior Publication Data

US 2003/0217475 A1 Nov. 27, 2003

(51) Int. Cl.[7] ............................................. G01B 5/25
(52) U.S. Cl. ................................... 33/645; 33/613
(58) Field of Search ......................... 33/645, 613, 644, 33/531, 533, 549; 29/281.5, 464

(56) References Cited

U.S. PATENT DOCUMENTS

| | | | | |
|---|---|---|---|---|
| 2,963,090 A | * | 12/1960 | Cole et al. | 33/645 |
| 3,817,146 A | * | 6/1974 | Scott | 411/384 |
| 4,538,355 A | * | 9/1985 | Morghen | 33/613 |
| 5,046,707 A | * | 9/1991 | Allen | 269/309 |
| 5,138,772 A | * | 8/1992 | Barnes | 33/613 |
| 5,799,408 A | * | 9/1998 | Sprayberry | 33/645 |
| 6,151,792 A | * | 11/2000 | Ohlig et al. | 33/613 |
| 6,163,160 A | * | 12/2000 | Hanrahan et al. | 324/758 |
| 6,644,641 B2 | * | 11/2003 | Phillips | 269/310 |

* cited by examiner

Primary Examiner—Christopher W. Fulton
Assistant Examiner—R. Alexander Smith

(57) ABSTRACT

A precision, hardened, radially relieved locating pin (20) comprised of a pair of cylindrically ground radially opposed locating segments (22), a pair of radially opposed radial reliefs (26) adjacent to the locating segments, a chamfered lead portion (30) and a mounting/attachment portion (32) which can be of any suitable configuration allowing interchangeability with diamond pin designs. The locating segments, the chamfered lead and the mounting/attachment portion are machined concentric about a common centerline (34). Radially opposed radial reliefs centerlines (36) are offset from, although parallel to, the common centerline. The amount of offset (38) is a direct function of desired travel (40) allowed between the locating pin and the feature (42) being located. The width (44) of the radially opposed locating segments is currently a percentage of segment diameter (24).

2 Claims, 2 Drawing Sheets

RADIALLY RELIEVED LOCATING PIN

BACKGROUND

1. Field of Invention

This invention relates to providing an easy to manufacture radially relieved locating pin which exhibits transverse strength nearing that which is only obtainable by a cylindrical pin.

2. Description of Prior Art

Assemblies, equipment, machinery, tooling, etc, currently utilizing freedom of related hole placement, must rely on use of relieved locating pins which to date are of a diamond configuration. Pins of a diamond configuration are inherently weak due to massive amount of material removal required to obtain a configuration referred to as a diamond. Removal of the aforementioned amounts of material greatly reduces the diamond pins transverse strength. No pin known to date possesses a non-point line contact of a current diamond relieved locating pin and the transverse strengths nearing that of a cylindrical locating pin.

OBJECTS AND ADVANTAGES

Accordingly, besides the objects and advantages of the radially relieved locating pin described above, several objects and advantages of present invention are:

(a) to provide a relieved locating pin that exhibits transverse strengths nearing that only obtainable by a full size cylindrical pin;

(b) to provide a stronger locating pin that is interchangeable with existing weaker pins of diamond design;

(c) to provide a pin who's superior strength will minimize breakage reducing possibility of damage to related assemblies;

(d) to provide a relieved locating pin who's configuration requires minimal material removal;

(e) to provide a relieved locating pin which requires no dedicated machinery or dedicated tooling to manufacture; and (f) to provide a relieved locating pin with reduced manufacturing costs.

Further objects and advantages will become apparent from a consideration of the ensuing description and drawings.

SUMMARY

In accordance with the present invention a radially relieved locating pin comprises a locating portion having two opposed cylindrically ground locating segments adjacent to two opposed radial reliefs, a mounting portion resides directly adjacent to above and is concentric with locating segments.

Figure 1:
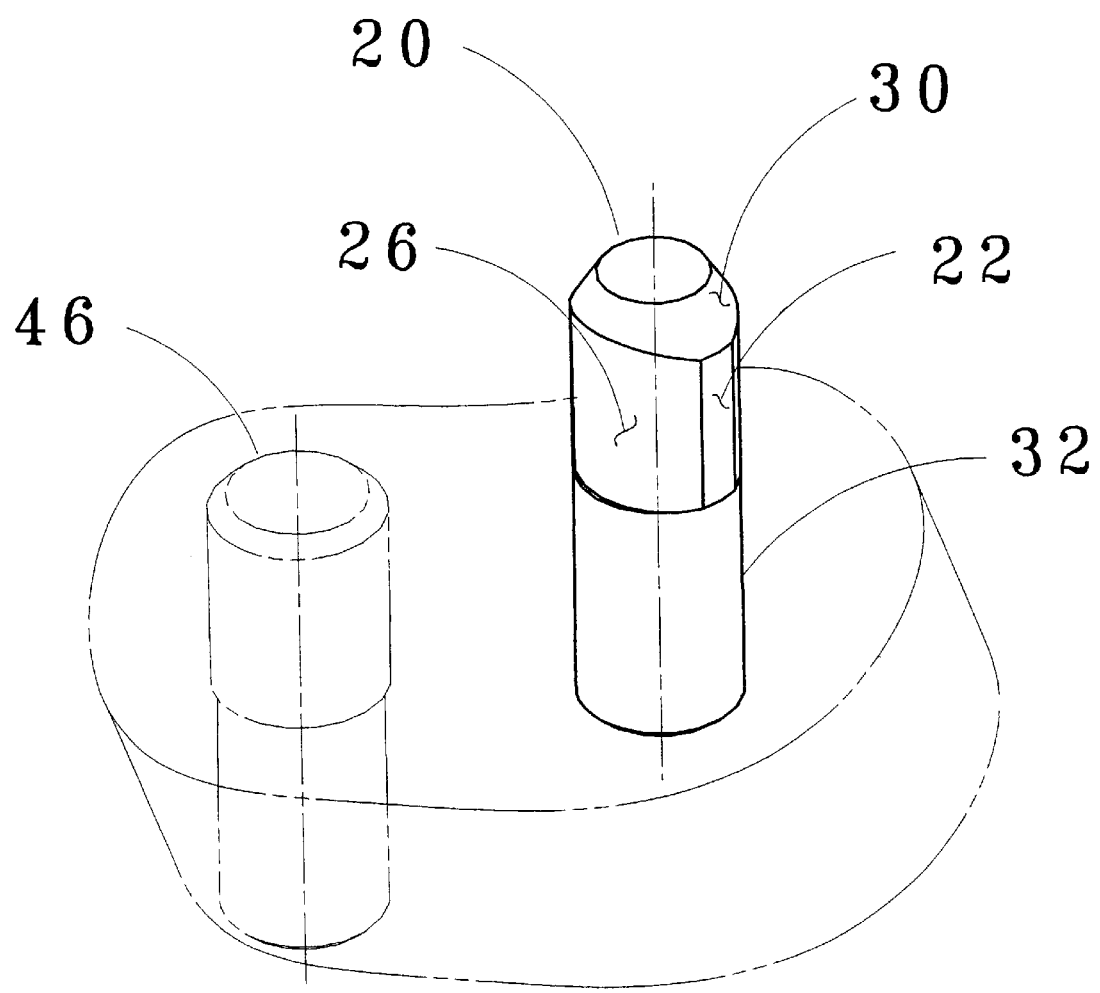
FIG. 1 shows a isometric view of an assembly showing proper orientation of a radially relieved locating pin to it's corresponding primary locator.

REFERENCE NUMERALS IN DRAWING 20 radially relieved locating pin
21 locating portion
22 cylindrically ground locating segments
24 cylindrically ground diameter of locating segments
26 radial reliefs
28 radius of radial reliefs
30 chamfered insertion lead
32 mounting/attachment portion
34 common centerline of locating segments and mounting/attachment features
36 centerlines for locating radial reliefs
38 offset from common centerline to radial relief centerlines
40 linear travel allowed by configuration
42 corresponding hole in mating part
44 width of locating segments
46 cylindrical primary locator
48 distance between radially relieved locating pin and corresponding primary locator
50 angle
52 bisecting line

DETAILED DESCRIPTION

Figure 2:
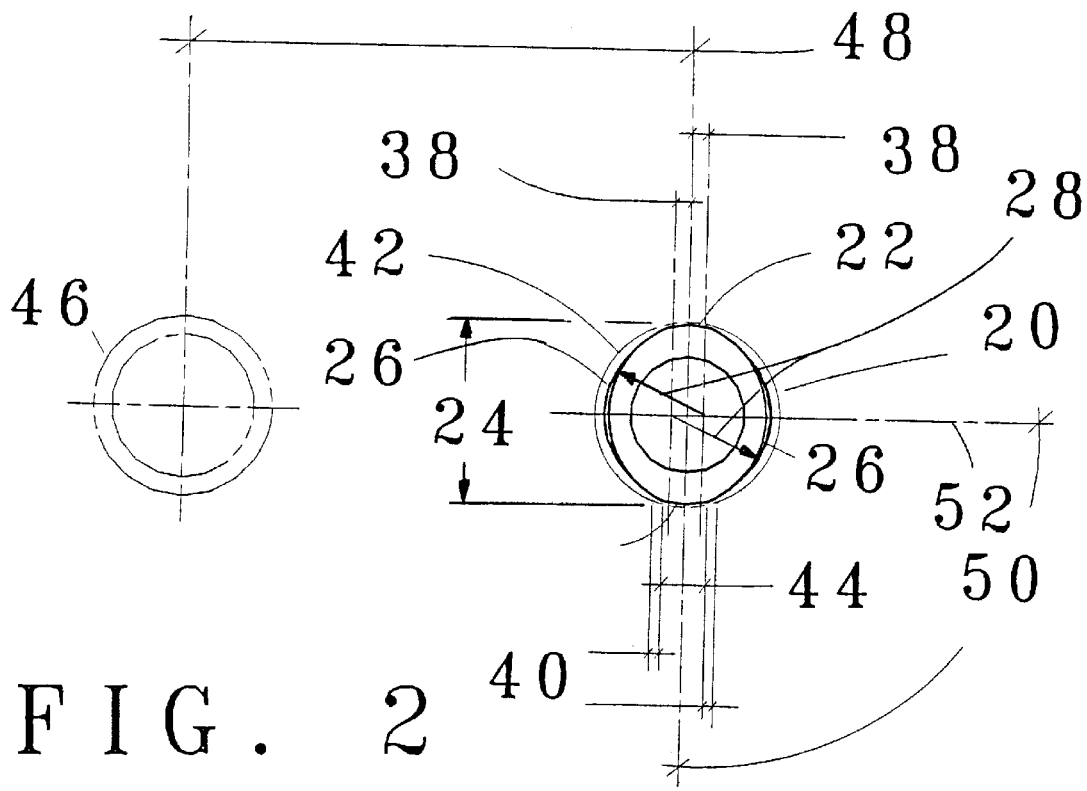
FIG. 2 shows a plan view of a radially relieved locating pin.
Figure 3:
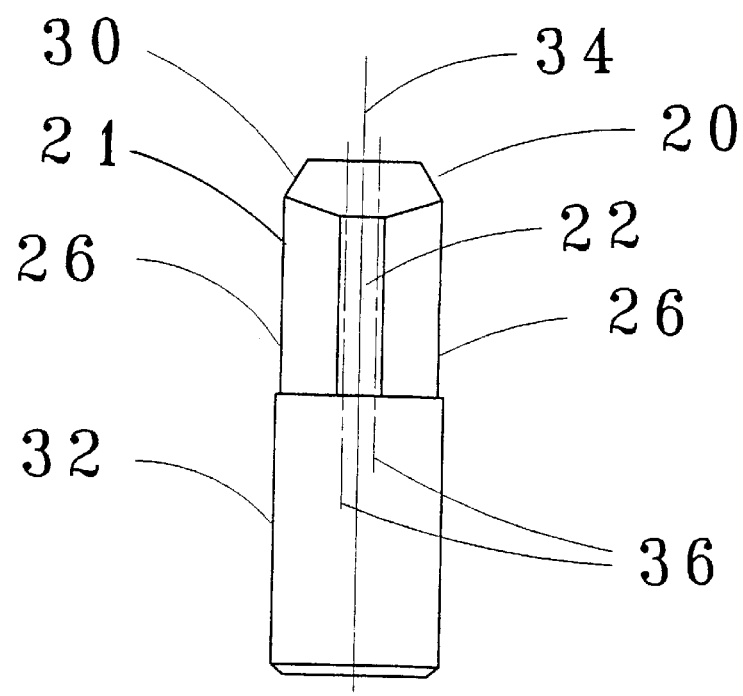
FIG. 3 shows a side view of a radially relieved locating pin.

Typical embodiment of radially relieved locating pin of this invention are illustrated in FIG. 1 (isometric view), FIG. 2 (end view) and FIG. 3 (side view). The radially relieved locating pin 20 is comprised of a locating portion 21 having two opposed cylindrically ground locating segments 22 concentric about centerline 34 with a diameter of 24. The width of locating segments 22 is defined as a percentage of diameter 24 to obtain width 44 which is symmetrical about centerline 34. Adjacent to locating segments 22 are two opposed radial reliefs 26. The size of radial reliefs 26 is determined by desired linear movement 40 and corresponding hole diameter 42. The above information determines radial relief radius 28, relief centerlines 36 and relief centerline offset dimensions 38. To aid insertion of locating pin 20 into mating hole a chamfer 30 which is concentric about centerline 34 is provided. At the opposite end of locating pin 20 is a cylindrical provision 32 which is concentric to locating segments 22 is shown for mounting/attachment 32. Primary locator 46 is shown to provide a proper visual orientation installation relationship to relieved locating pin 20. The primary locator 46 and locating pin 20 lie along a bisecting line 52 which intersects the primary locator 46, intersects the centerline 34 of the locating pin and bisects the radial reliefs 26 such that the installation angle 50 is perpendicular as shown in FIG. 2. By using a radially relieved locating pin 20 as shown, the spread between primary locator 46 and radially relieved locating pin 20 can accept a relaxed tolerance 48. There are numerous methods of mounting and adding additional features may be beneficial for the manufacture of radially relieved locating pins. Therefore this invention is not to be limited to configuration shown.

Operation of Radially Relieved Locating Pin

In FIG. 2 (top view) it is easy to see that the cylindrical primary locator 46 would positively locate a part while the radially relieved locating pin 20 is for radial positioning only. Radial positioning pins often have great pressures exerted against them and need to be as strong as possible. The radially relieved locating pin 20 has almost as much strength as a full cylindrical pin of same size since there is minimum metal removal 26 required to obtain this configuration.

SUMMARY, RAMIFICATIONS AND SCOPE

Accordingly, the reader will see that the radially relieved locating pin of this invention is a very important and necessary device for use in all types of transportation, equipment, machinery, tooling, etc for prevention of failures thereby minimizing the possibility of catastrophic damage to related entities.

Furthermore the radially relieved locating pin requires minimum material removal; and

- it is much stronger than a same size diamond pin of present art;
- it helps prevent expensive damage caused by failure of diamond pins of present art;
- it can be configured as a direct replacement for much weaker diamond pins of present art;
- it is less expensive to manufacture;
- it does not require custom dedicated machinery;
- it does not require custom dedicated tooling; and
- it saves man hours required replacing relieved pins of lesser strength.

Although the descriptions above list many advantages, these should not be construed as limiting the scope of this invention but as merely providing illustrations of some of the advantages of using this invention.

For example the radially relieved locating pin may have other methods for mounting and may contain reliefs and radii to aid manufacture.

Thus the scope of this invention should be determined by the appended claims and their legal equivalents rather than by examples given.

What is claimed is:

1. A radially relieved locating pin for use in adjoining of parts having a slight hole to hole mismatch to be held in correct radial orientation, the radially relieved locating pin comprising:

a mounting portion and a locating portion wherein said locating and mounting portions have a common centerline, said locating portion having a pair of symmetric indexing segments and a pair of radial reliefs which are alternately interposed and conjoined to each other, such that one of said pair of indexing segments is located opposite the other of said pair of indexing segments relative to the common centerline, and such that one of said pair of radial reliefs is located opposite the other of said pair of radial reliefs relative to the common centerline, each of said pair of radial reliefs having a radial relief centerline that is parallel to to the common centerline wherein each of said pair of radial reliefs and the associated radial relief centerline define a radial relief radius, wherein a single line substantially bisects each of said radial reliefs and passes through said common centerline and wherein said centerline for locating each of said radial reliefs is located along said single line on the opposite side of the common centerline from the respective radial relief.

2. The radially relieved locating pin of claim 1 further comprising a chamfer at the outward end of the locating portion.

* * * * *